(12) United States Patent
Li et al.

(10) Patent No.: US 8,281,411 B2
(45) Date of Patent: *Oct. 2, 2012

(54) SECURITY MEMORY DEVICE AND METHOD FOR MAKING SAME

(75) Inventors: Minfu Li, Taipei (TW); Min Nan Yen, Taipei (TW)

(73) Assignee: Macronix International Co., Ltd., Hsinchu (TW)

( * ) Notice: Subject to any disclaimer, the term of this patent is extended or adjusted under 35 U.S.C. 154(b) by 105 days.

This patent is subject to a terminal disclaimer.

(21) Appl. No.: 12/212,308

(22) Filed: Sep. 17, 2008

(65) Prior Publication Data

US 2009/0241200 A1    Sep. 24, 2009

Related U.S. Application Data

(63) Continuation of application No. 10/189,084, filed on Jul. 3, 2002, now Pat. No. 7,444,682.

(51) Int. Cl.
*G06F 21/00* (2006.01)

(52) U.S. Cl. ............... 726/32; 726/33; 726/34; 726/35

(58) Field of Classification Search .................. None
See application file for complete search history.

(56) References Cited

U.S. PATENT DOCUMENTS

| | | | | |
|---|---|---|---|---|
| 4,558,176 A | * | 12/1985 | Arnold et al. | 713/190 |
| 4,584,641 A | | 4/1986 | Guglielmino | |
| 4,685,056 A | * | 8/1987 | Barnsdale et al. | 711/164 |
| 5,155,829 A | | 10/1992 | Koo | |
| 5,396,471 A | | 3/1995 | Kitsu | |
| 5,442,704 A | * | 8/1995 | Holtey | 711/163 |
| 5,606,315 A | * | 2/1997 | Gaskins | 340/5.74 |
| 5,991,519 A | * | 11/1999 | Benhammou et al. | 726/3 |
| 6,067,622 A | | 5/2000 | Moore | |
| 6,175,925 B1 | | 1/2001 | Nardone et al. | |
| 6,229,731 B1 | | 5/2001 | Kasai et al. | |
| 6,308,270 B1 | | 10/2001 | Guthery | |
| 6,351,418 B1 | | 2/2002 | Tomohiro | |
| 6,388,919 B2 | | 5/2002 | Terasaki | |
| 6,782,458 B1 | | 8/2004 | Noble | |
| 7,249,231 B2 | * | 7/2007 | Babudri et al. | 711/156 |
| 7,444,682 B2 | * | 10/2008 | Li et al. | 726/32 |
| 2002/0006060 A1 | * | 1/2002 | Ikeda | 365/185.04 |
| 2003/0065934 A1 | * | 4/2003 | Angelo et al. | 713/200 |
| 2003/0200454 A1 | * | 10/2003 | Foster et al. | 713/200 |

FOREIGN PATENT DOCUMENTS

CN           1344995 A        4/2002

* cited by examiner

*Primary Examiner* — David Pearson

(74) *Attorney, Agent, or Firm* — Stout, Uxa, Buyan & Mullins, LLP

(57) ABSTRACT

A security memory device includes a memory cell array that stores a plurality of contents, including a mine, which is stored as a portion of the plurality of contents. The mine is triggered when it is accessed, typically such that the mine erases the memory contents. Also, control logic is included that controls access to the plurality of contents. In one aspect, the memory cell array can include a protected-cell zone and a free-cell zone. In this aspect, the security memory device can further include a lock that provides protection for contents stored in the protected-cell zone from access and a key that is capable of unlocking the lock.

19 Claims, 5 Drawing Sheets

SECURITY MEMORY DEVICE AND METHOD FOR MAKING SAME

CROSS-REFERENCE TO RELATED APPLICATIONS

This application is a continuation of U.S. application Ser. No. 10/189,084, filed Jul. 3, 2002, now U.S. Pat. No. 7,444,682 the entire contents of which are hereby incorporated by reference.

BACKGROUND OF THE INVENTION

1. Field of the Invention

This invention relates generally to memory devices, and more particularly to security memory devices that provide protection from unauthorized duplication.

2. Description of the Related Art

Computer systems, such as desktops, notebooks, and servers, typically use flash memories to store the basic input output system (BIOS), which boots the computer system during power up. Flash memories are also used to install operating systems and provide basic input/output routines for many computer systems. Thus, flash memories have an important role in all computer systems today.

Flash memories also have an important role in the operation of small devices, such as mobile phones, personal digital assistants (PDAs), set-top boxes, and game machines. In such computer systems, flash memories provide almost all of the applications executed on the computer systems. That is, almost all the software that is run on small devices is stored in flash memories.

Unfortunately, the software contents of flash memories is often vulnerable to unauthorized duplication. Such unauthorized copied software is commonly distributed on a wide-scale basis over the Internet and via flash memories and recordable CD-ROMs. As a result, software developers lose billions of dollars each year from such unauthorized copying and distribution.

Software developers commonly use a variety of different forms of copy protection to prevent unauthorized copying and using of their products. One of the most robust methods involves reverse engineering. When a chip is reverse engineered, all the individual circuits that make up the chip are identified, and the source code is reverse engineered into design models or specifications.

In view of the foregoing, there is a need for systems and methods for protecting flash memory from unauthorized duplication. The systems should discourage unauthorized coping of flash memory content by erasing or otherwise rendering the flash memory content unusable.

SUMMARY OF THE INVENTION

Broadly speaking, the present invention fills these needs by providing a security memory device having a mine element that renders the memory device unusable when accessed. Because the location of the mine element is unknown, unauthorized memory access inevitably triggers the mine element. In one embodiment, a security memory device is disclosed. The security memory device includes a memory cell array that stores a plurality of contents, including a mine, which is stored as a portion of the plurality of contents. The mine is triggered when it is accessed, typically such that the mine erases the memory contents. Also, control logic is included that controls access to the plurality of contents. In one aspect, the memory cell array can include a protected-cell zone and a free-cell zone. In this aspect, the security memory device can further include a lock that provides protection for contents stored in the protected-cell zone from access and a key that is capable of unlocking the lock. Typically, the mine can be randomly stored in the protected-cell zone. Further, the plurality of contents can include both data and code. For example, the code can relate to an application, or to an operation system. Generally, the security memory device is a flash memory.

In a further embodiment, a security memory design system for designing a security memory device is disclosed. The security memory design system includes a memory that stores a plurality of contents, which includes a mine. In addition, a writing module is included that is capable of writing the contents into a security memory device. A mine register is further included that stores an address of the mine in the security memory device. As above, the mine is triggered when the mine is accessed in the security memory device. The security memory design system can further include an editing module that is capable of editing the contents in the security memory device. The editing module avoids accessing the mine according to the address stored in the mine register. Further, a key/lock generating module can be included that is capable of generating a key and a lock for the security memory device. In operation, the writing module writes the key and lock into the security memory device. As above, the lock protects contents stored in a protected-cell zone of the security memory device from access, and the key is capable of unlocking the lock. In this manner, a developer can write to the contents of the security memory device without triggering the mine when using the security memory design system.

A method for producing a security memory device is disclosed in a further embodiment of the present invention. A plurality of contents that includes a mine is provided. The plurality of contents is then written into a security memory device such that the mine is triggered when the mine is accessed. In addition, an address of the mine is recorded into a mine register. In one aspect, a key and lock can be written into the security memory device. In this aspect, the lock protects contents stored in a protected-cell zone of the security memory device from access, and the key is capable of unlocking the lock.

In another embodiment, a method for accessing a security memory device is disclosed. An address of a mine stored in a security memory device is determined. Then, using the address of the mine, contents stored in the security memory device is accessed without accessing the mine. As above, the mine is triggered if it is accessed. In addition, a lock can be unlocked with a key. In this aspect, the lock protects contents stored in a protected-cell zone of the security memory device from access, and the key is capable of unlocking the lock. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a security memory device having a mine element that renders the memory device unusable when accessed. Broadly speaking, using the embodiments of the present invention, unauthorized memory access inevitably triggers the mine element because the location of the mine element is unknown. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
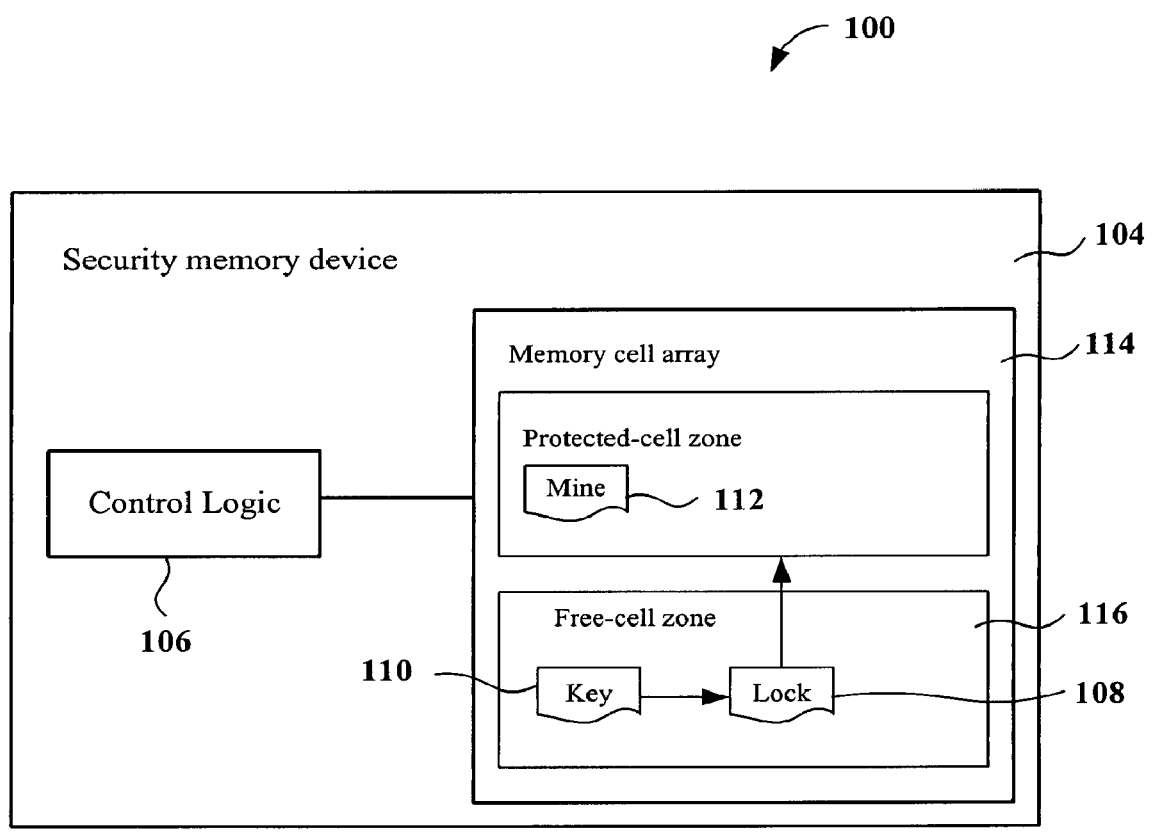
FIG. 1 is a block diagram showing a security memory device, in accordance with an embodiment of the present invention.

FIG. 1 is a block diagram showing a security memory device 100, in accordance with an embodiment of the present invention. The security memory device 100 includes control logic unit 106 in communication with a memory cell array 104. The memory cell array 104 includes a protected-cell zone 114 having at least one mine 112, and a free-cell zone 116 having a lock 108 storing a key value 110. Although only one mine 112 is illustrated in FIG. 1, it should be noted that any number of mines can be included in the memory cell array 104 of the embodiments of the present invention, both in the protected-cell zone 114 and the free-cell zone 116.

As mentioned above, the memory cell array 104 has both a protected-cell zone 114 and a free-cell zone 116. The free-cell zone 116 generally is accessible to a user, and typically includes boot information for the security memory device 100. Protected information is stored in the protected-cell zone 114, which is locked using the lock 108. Specifically, the lock 108 protects the protected-cell zone 114 from access by storing a particular access key. The access key 110 can be used to "unlock" the lock 108. That is, the lock 108 stores a particular set of data words. These words are then compared to the provided access key 110 to determine whether the key stored in the lock 108 matches the key attempting to unlock the lock 108. When a match occurs, the lock 108 allows the protected contents to be accessed.

To further protect against unauthorized access, a mine 112 renders the contents of the memory unreadable upon being accessed. In one embodiment, the mine 112 erases the contents of the protected-cell zone 114 when the memory address of the mine 112 is accessed. The mine 112 is randomly located and, as such, generally cannot be avoided when accessing the memory cell array 104 unless the mine's 112 exact memory address is known.

Figures 2A, 2B, 2C:
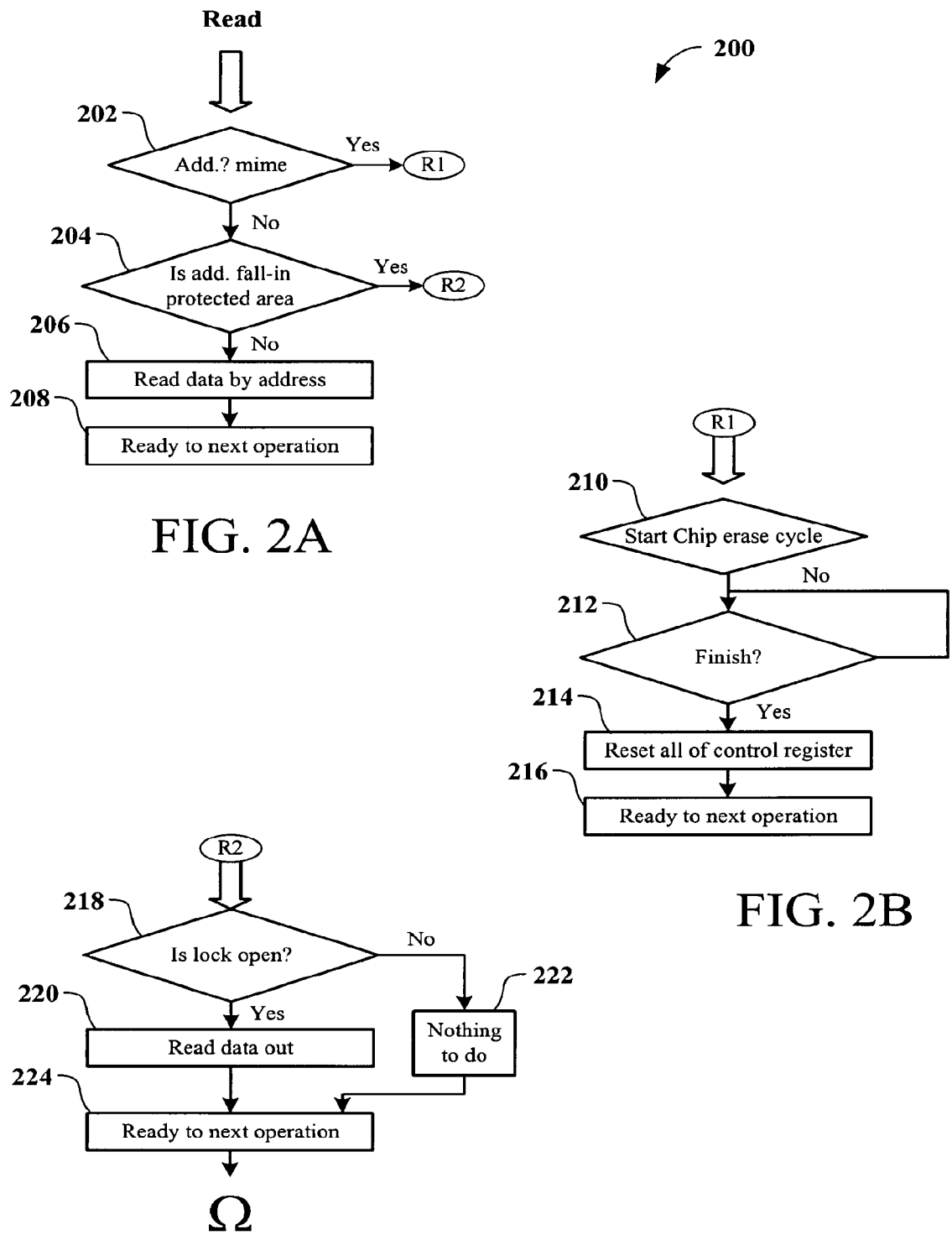
FIGS. 2A-2C are flowcharts showing a method for performing a read cycle using a security memory device, in accordance with an embodiment of the present invention.

FIGS. 2A-2C are flowcharts showing a method 200 for performing a read cycle using a security memory device in accordance with an embodiment of the present invention. As shown in FIG. 2A, upon receiving a read command, the method determines whether the read address matches the address of a mine, in operation 202. As mentioned above, mines are used by the embodiments of the present invention to protect against unauthorized duplication by rendering the contents of the memory unreadable. Hence, if the read address matches the address of a mine, the method 200 proceeds to pointer R1. Otherwise, the method 200 proceeds to operation 204.

In operation 204, a decision is made as to whether the read address is located within the protected-cell zone. The protected-cell zone stores data protected from unauthorized duplication. As such, if the read address is located within the protected-cell zone, the proceeds to pointer R2. Otherwise, the read address is located in the free-cell zone and the method 200 proceeds to read the data at the read address in operation 206. The security memory device then prepares for the next operation, in operation 208.

Referring to FIG. 2B, when a mine is addressed in a read operation, the method continues from pointer R1 and a chip erase cycle is started, in operation 210. The method 200 waits for the chip erase cycle to complete in operation 212. An exemplary chip erase cycle will be described in greater detail subsequently, with reference to FIG. 4. Upon completing the erase cycle, all control registers are reset, in operation 214, and the security memory device then prepares for the next operation, in operation 216.

Referring to FIG. 2C, when the protected-cell zone is accessed, the method continues from pointer R2 and the state of the lock is checked, in operation 218. Specifically, the lock is checked to determine whether the lock is currently open. If the lock is currently open, the data at the read address is read from protected-cell zone memory, in operation 220. Otherwise, the read command is ignored, in operation 227. The security memory device then prepares for the next operation, in operation 224. In this manner, embodiments of the present invention provide protection against unauthorized memory access and duplication. In addition, embodiments of the present invention further protect against data corruption during write operations, as described next with reference to FIGS. 3A and 3B.

Figure 3A:
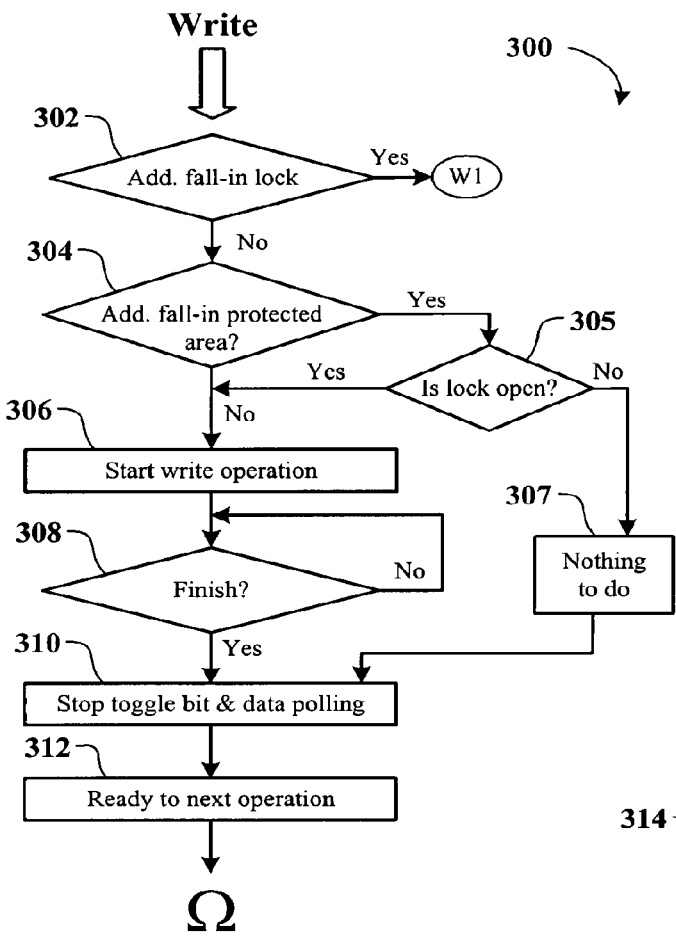
FIGS. 3A and 3B are flowcharts showing a method for performing a write cycle using a security memory device, in accordance with an embodiment of the present invention.
Figure 3B:
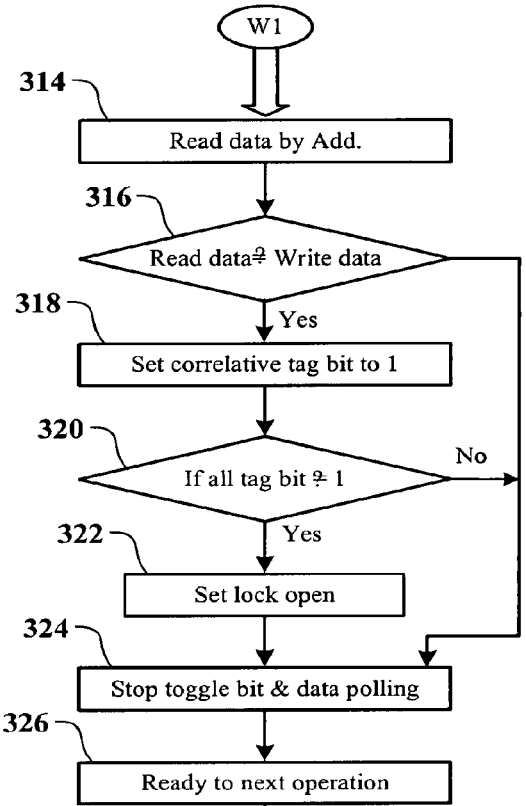

FIGS. 3A and 3B are flowcharts showing a method 300 for performing a write cycle using a security memory device, in accordance with an embodiment of the present invention. As shown in FIG. 3A, upon receiving a write command, the security memory device determines whether the write address is located within the lock location in the free-cell zone, in operation 302. As mentioned previously, embodiments of the present invention protected data using a lock, which controls access to the protected-cell zone. To this end, if the write address falls within the lock location, the user is attempting to unlock the lock, and the method proceeds to pointer W1. Otherwise, the user is attempting to write to flash memory, and the method 300 continues with operation 304.

In operation 304, a decision is made as to whether the write address is within the protected-cell zone. If the write address is within the protected-cell zone the method determines the state of the lock, in operation 305. Otherwise, the write operation is commenced in operation 306. The security memory device completes the write command in operation 308.

In operation 305, a decision is made as to whether the lock is currently open. If the lock is currently open, the write operation is started, in operation 306. Otherwise, the write command is ignored, in operation 307. The toggle bit and data polling is stopped in operation 310, and the security memory device prepares for the next operation, in operation 312. In this manner, embodiments of the present invention provide protection against unauthorized memory alteration.

Referring next to FIG. 3B, if the write address falls within the lock location, the user is attempting to unlock the lock, and method proceeds from pointer W1 to read the lock data, in operation 314. A decision is then made as to whether the lock data is equal to the write data, in operation 316. Embodiments of the present invention unlock the protected memory area when a user provides a key for the lock. In one embodiment, a key value is stored at the lock memory address. When the user supplies a matching key value, the lock is unlocked and the user is allowed access to the protected memory area. Hence, if the lock data is equal to the write data, the correlative tag bit is set to "1," in operation 318. Otherwise, the method continues to operation 324.

In operation 320, the tag bit is examined to determine if it is equal to "1." If the tag bit is equal to "1," the lock state is set to open, in operation 322. Otherwise, the method continues to operation 324. The toggle bit and data polling is stopped in operation 324, and the security memory device prepares for the next operation, in operation 326. In this manner, embodiments of the present invention provide protection against unauthorized memory alteration.

Figure 4:
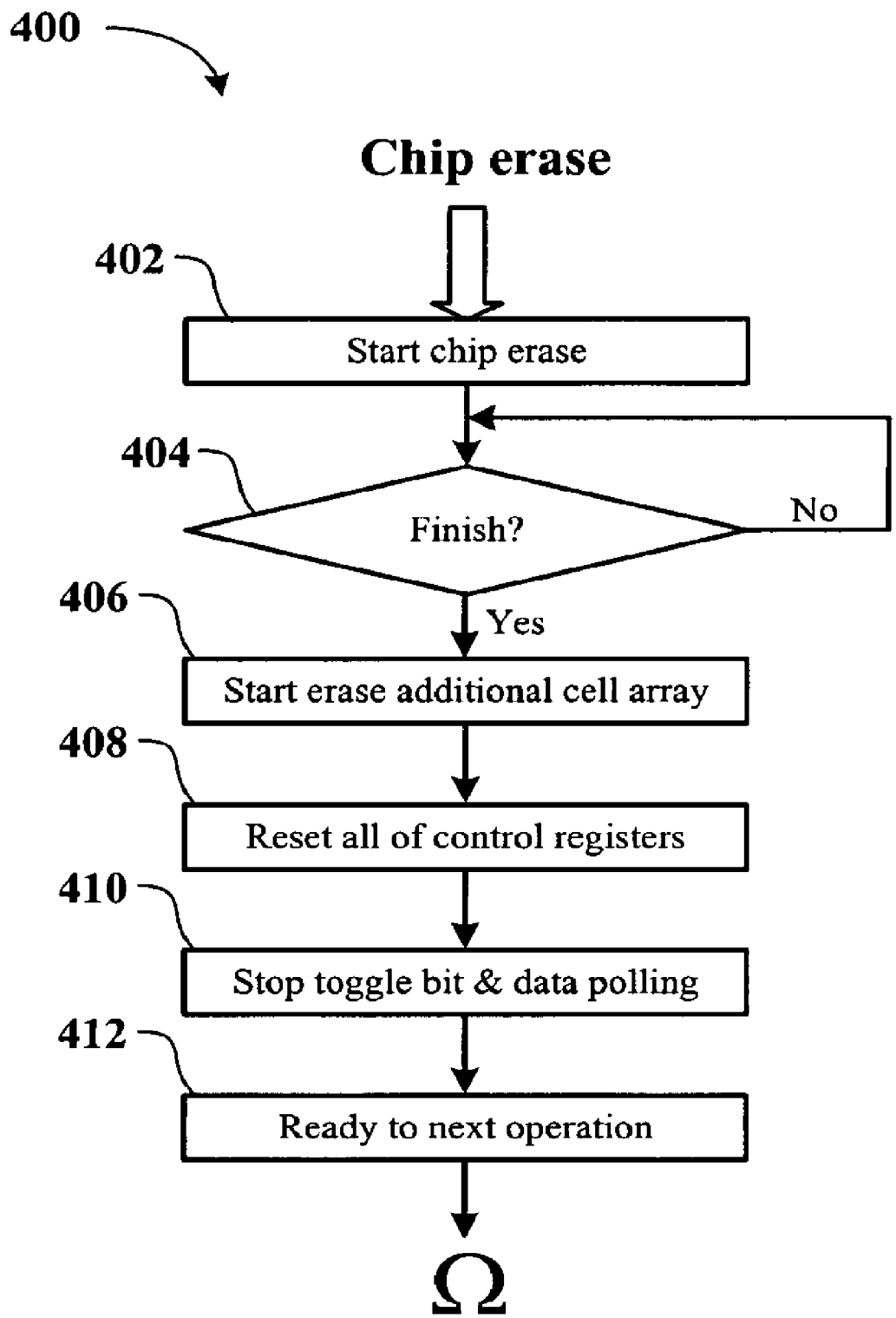
FIG. 4 is flowchart showing a method for processing a chip erase command, in accordance with an embodiment of the present invention.

FIG. 4 is flowchart showing a method 400 for processing a chip erase command, in accordance with an embodiment of the present invention. In operation 402, a chip erase operation is commenced. In addition, the chip erase operation is completed in operation 404. Any additional cell arrays are then erased in operation 406. Further, all control registers are reset in operation 408. The toggle bit and data polling is stopped in operation 410, and the security memory device prepares for the next operation, in operation 412. Hence, the data content of the memory is rendered unreadable upon access of a mine.

Figure 5:
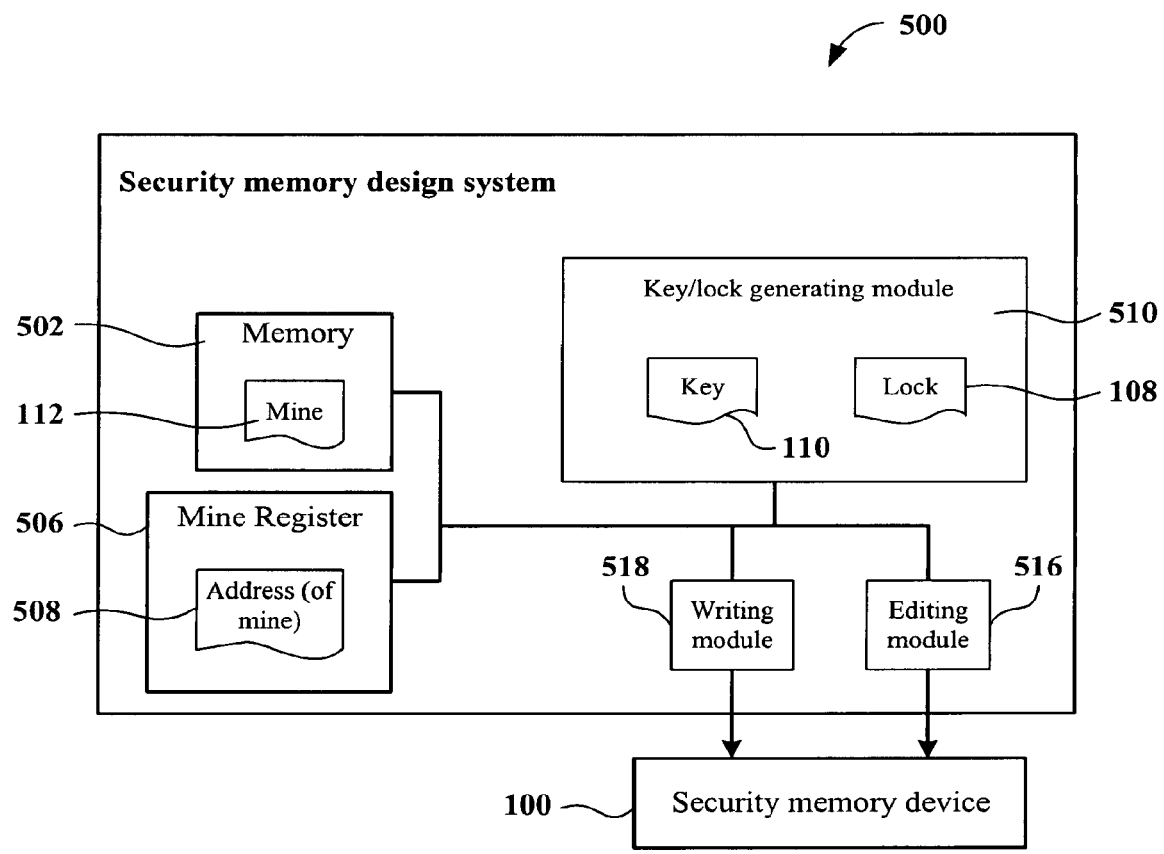
FIG. 5 is a block diagram showing a security memory design system, in accordance with an embodiment of the present invention.

To program a security memory device of the embodiments of the present invention, a security memory design system is used. FIG. 5 is a block diagram showing a security memory design system 500, in accordance with an embodiment of the present invention. The security memory design system 500 includes a memory 502, including a mine 112, and a mine register 506, including the mine address 508. In addition, a key/lock generating module 510 is included that has a key value 110 and a lock 108. Finally, a writing module 518 and an editing module 516 are included that are each coupled to the security memory device 100 being programmed.

In operation, the memory 502 stores the data that will be written into the security memory device 100, and the writing module 518 writes this data into the security memory device 100. The mine register 506 stores a mine address 508 of the mine 112 in the security memory device 100. Thus, mine register 506 allows the security memory design system 500 to avoid the location of the mine 112 when programming the security memory device 100.

The key/lock generating module 510 generates a key/lock set, such as the key value 110 and the lock 108. In addition to the contents of the memory 502, the writing module 518 writes key value 110 and the lock 108 to the security memory device 100. In addition, the editing module can be used to edit the contents of the security memory device 100 while avoiding the mines using the mine address 508 stored in the mine register 506.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A security memory chip, comprising:
   a flash array for executing write operation, the flash array storing a plurality of contents, wherein the flash array comprises a protected-cell zone and a free-cell zone;
   a lock in the free-cell zone, the lock providing protection for the contents in the protected-cell zone for access;
   means for erasing readout-prohibited contents stored in the protected-cell zone of the flash array when the means for erasing readout-prohibited contents is read, wherein the means for erasing readout-prohibited contents is in the protected-cell zone; and
   a control logic that controls access to the plurality of contents.

2. A security memory chip as claimed in claim 1, further comprises a key in the free-cell zone capable of unlocking the lock.

3. A security memory chip, comprising:
   a flash array for executing read, write, and erase operation, the flash array storing a plurality of contents, wherein the flash array comprises a protected-cell zone and a free-cell zone;
   a lock in the free-cell zone, the lock providing protection for contents stored in the protected-cell zone from access;
   a key in the free-cell zone capable of unlocking the lock;
   a means for erasing readout-prohibited contents stored in the protected-cell zone of the flash array as a portion of the plurality of contents for protecting against unauthorized readout, the means for erasing readout-prohibited contents triggering erasure of one or more readout-prohibited contents stored in the flash array when the means for erasing readout-prohibited contents is read, wherein the means for erasing readout-prohibited contents is randomly stored in the protected-cell zone; and
   a control logic that controls access to the plurality of contents.

4. A security memory chip as recited in claim 3, wherein the plurality of contents includes data and code.

5. A security memory chip as recited in claim 4, wherein the code relates to an application.

6. A security memory chip as recited in claim 4, wherein the code relates to an operating system.

7. A single flash memory chip for providing protection against unauthorized memory access and duplication, the single flash memory chip comprising:
   a flash array for executing read, write and erase in the single flash memory chip, the flash array including a protected-cell zone;
   a means for erasing readout-prohibited contents register storing an address of a means for erasing readout-prohibited contents in the protected-cell zone, wherein the means for erasing readout-prohibited contents is randomly located; and
   a control logic unit configured such that when the single flash memory chip receives a read command accessing the protected-cell zone, and address of the read command is compared with the address of the means for erasing readout-prohibited contents, and the single flash memory chip erases readout-prohibited contents of the protected-cell zone when the address of the read command matches the address of the means for erasing readout-prohibited contents.

8. The single flash memory chip of claim 7, further comprising an editing module capable of editing contents of the flash memory chip, wherein the editing module avoids accessing the means for erasing readout-prohibited contents according to the address stored in the means for erasing readout-prohibited contents register.

9. The single flash memory chip of claim 7, wherein the flash array stores data and code.

10. The single flash memory chip of claim 9, wherein the code is an application.

11. The flash memory chip of claim 9, wherein the code is an operating system.

12. A method for protecting against unauthorized memory access and duplication in a single flash memory chip which is capable of executing read, write and erase in the single flash memory chip, the method comprising the operations of:
    recording an address of a means for erasing readout-prohibited contents into a means for erasing readout-prohibited contents register, the means for erasing readout-prohibited contents being located within a protected-cell zone of the single flash memory chip, wherein the means for erasing readout-prohibited contents is randomly located;
    receiving a read command accessing the protected-cell zone;
    comparing an address of the read command with the address of the means for erasing readout-prohibited contents; and
    erasing readout-prohibited contents of the protected-cell zone when the address of the read command matches the address of the means for erasing readout-prohibited contents.

13. The method of claim 12, wherein the single flash memory chip stores data and code.

14. The method of claim 13, wherein the code is an application.

15. The method of claim 13, wherein the code is an operating system.

16. A method for using a single flash memory chip which is capable of executing read, write and erase in the single flash memory chip, the method comprising the operations of:
    writing contents to a protected-cell zone of the single flash memory chip, the flash memory chip comprising a flash array;
    locating a means for erasing readout-prohibited contents within the protected-cell zone of the single flash memory chip such that a read request having an address that matches an address of the means for erasing readout-prohibited contents triggers erasure of the readout-prohibited contents, therefore protecting against unauthorized readout, wherein the means for erasing readout-prohibited contents is randomly stored in the protected-cell zone;
    determining an address of the means for erasing readout-prohibited contents; and
    accessing contents stored in the flash memory chip without accessing the means for erasing readout-prohibited contents using the address of the means for erasing readout-prohibited contents.

17. A method as recited in claim 16, wherein the contents include data and code.

18. A method as recited in claim 17, wherein the code is an application.

19. A method as recited in claim 17, wherein the code is an operating system.

* * * * *